United States Patent
Ocak et al.

(10) Patent No.: US 11,178,523 B2
(45) Date of Patent: Nov. 16, 2021

(54) FIRST COMMUNICATION DEVICE, NETWORK DEVICE AND METHODS THEREIN FOR INDENTIFYING AT LEAST ONE SECOND COMMUNICATION DEVICE PROVIDING A SEMANTIC REPRESENTATION

(71) Applicant: Telefonaktiebolaget LM Ericsson (publ), Stockholm (SE)

(72) Inventors: Mert Ocak, Helsinki (FI); Nicklas Beijar, Kirkkonummi (FI); Jaime Jiménez, Helsinki (FI)

(73) Assignee: TELEFONAKTIEBOLAGET LM ERICSSON (PUBL), Stockholm (SE)

(*) Notice: Subject to any disclaimer, the term of this patent is extended or adjusted under 35 U.S.C. 154(b) by 140 days.

(21) Appl. No.: 16/487,520

(22) PCT Filed: Feb. 22, 2017

(86) PCT No.: PCT/EP2017/054038
§ 371 (c)(1),
(2) Date: Aug. 21, 2019

(87) PCT Pub. No.: WO2018/153441
PCT Pub. Date: Aug. 30, 2018

(65) Prior Publication Data
US 2020/0059765 A1    Feb. 20, 2020

(51) Int. Cl.
*H04W 4/38* (2018.01)
*H04L 12/24* (2006.01)
*H04W 4/70* (2018.01)

(52) U.S. Cl.
CPC ........... *H04W 4/38* (2018.02); *H04L 41/0893* (2013.01); *H04L 41/145* (2013.01); *H04W 4/70* (2018.02)

(58) Field of Classification Search
CPC ...... H04W 4/38; H04W 4/70; H04L 41/0893; H04L 41/145
(Continued)

(56) References Cited

U.S. PATENT DOCUMENTS

2014/0330929 A1* 11/2014 Dong ............... H04W 4/70
                                                    709/217
2015/0067154 A1*  3/2015 Ly ................. H04W 4/38
                                                    709/224

FOREIGN PATENT DOCUMENTS

WO    2015/191965 A2    12/2015
WO    2016/128415 A1     8/2016

OTHER PUBLICATIONS

International Search Report and Written Opinion issued in International Application No. PCT/EP2017/054038, dated Oct. 27, 2017, (11 pages).

* cited by examiner

Primary Examiner — Faisal Choudhury
(74) Attorney, Agent, or Firm — Rothwell, Figg, Ernst & Manbeck, P.C.

(57) ABSTRACT

A method performed by a first communication device, for identifying at least one second communication device each second communication device providing a respective semantic representation. The first communication device and a number of second communication devices operate in a communications network. The first communication device decides (201) a target semantic representation and decides (202) a threshold related to a tolerated semantic distance between a semantic representation and the target semantic representation. The first communication device sends (203) to one or more network devices in the communications network, a request for any one or more second communication devices out of the number of second communication (Continued)

devices, providing a semantic representation having a semantic distance below the decided threshold. The first communication device then receives (204) from any of the one or more network devices a message identifying at least one second communication device providing a semantic representation according to the request.

19 Claims, 8 Drawing Sheets

(58) Field of Classification Search
USPC .......................................................... 370/254
See application file for complete search history.

Fig. 2 Method in first communication device 121

Fig. 3    Method in network device 110, 122

FIRST COMMUNICATION DEVICE, NETWORK DEVICE AND METHODS THEREIN FOR INDENTIFYING AT LEAST ONE SECOND COMMUNICATION DEVICE PROVIDING A SEMANTIC REPRESENTATION

CROSS REFERENCE TO RELATED APPLICATION(S)

This application is a 35 U.S.C. § 371 National Stage of International Patent Application No. PCT/EP2017/054038, filed Feb. 22, 2017, designating the United States.

TECHNICAL FIELD

Embodiments herein relate to a first communication device, a network device and methods therein. In particular, they relate to identifying at least one second communication device each second communication device providing a respective semantic representation.

BACKGROUND

Small devices with limited CPU, memory, and power resources, are referred to as constrained devices. They are often used as sensors and actuators, smart objects, or smart devices, and they can form a network, referred to as constrained nodes in that network. The devices are typically connected using a constrained network. Such a constrained network may provide unreliable or dropped channels, limited and unpredictable bandwidth, and a highly dynamic topology.

Constrained Application Protocol (CoAP) is an application protocol defined by Internet Engineering Task Force (IETF) for Machine To Machine (M2M) applications in constrained nodes and constrained networks. CoAP provides a request-response based Representational State Transfer (REST) based communication architecture between constrained nodes or between constrained nodes and nodes on the Internet. Hence, CoAP may easily be integrated to the web and web services by translating CoAP messages to Hypertext Transfer Protocol (HTTP). One of the available extensions to CoAP enables CoAP clients to observe resources from CoAP servers, i.e., CoAP servers to notify CoAP clients when the resource is modified. This enables server-initiated communication in constrained networks using CoAP, which is an important asset for constrained environments. A CoAP Resource Directory (RD) is an entity which hosts descriptions of resources held on other CoAP servers, allowing lookups to be performed for those resources.

Open Mobile Alliance (OMA) Device Management (DM) Lightweight M2M (LWM2M) is a light and compact device management protocol that is used for managing Internet of Things (IoT) devices and their resources. LWM2M runs on top of CoAP, which either uses UDP or SMS bindings. Hence, LWM2M is compatible with any constrained device, which supports CoAP. LWM2M defines three components:
    LWM2M Client: This is a M2M sensor, actuator or similar device. It contains several LWM2M objects, each comprising several resources. The LWM2M Server can execute commands on these resources to manage the client, which commands e.g. may be commands to read, to delete or to update the resources. LWM2M Clients are generally the constrained devices.
    LWM2M Server: It manages LWM2M Clients by sending management commands to them.
    LWM2M Bootstrap Server: It is used to manage the initial configuration parameters of LWM2M Clients during bootstrapping the device. The term bootstrap refers to the first time the device is started, or when the device memory has been cleared. The term Bootstrap also refers to the process by which a device gets the appropriate security credentials. LWM2M outlines interfaces for bootstrapping, client registration, information reporting, device management and enablement. There are also pre-defined LWM2M Object Models for performing such interface operations. Object Models define the set of manageable objects and resources and the possible operations on them.

To provide semantic interoperability between different IoT systems, several approaches have been considered including Internet Protocol Smart Objects (IPSO) for data models and Sensor Markup Language (SenML) in IETF for data serialization. IPSO Smart Objects are based on the LWM2M object model and provides more generic and use case oriented data models to express sensor capabilities and sensor resources. In CoAP the sensor capabilities and sensor resources are generically called resources. However it is possible to create a more canonical form of representation focusing on the data models and semantic information of the devices. For that, IPSO Object models may be used, in which the managed entities are represented as resources, e.g. measured value, maximum value, etc., which are grouped together as objects, e.g. temperature meter. In this example, the temperature meter object has a resource indicating the measured temperature, and a resource indicating the minimum temperature, etc. There may be several instances of an object, e.g. in the case when a communication device has several sensors, e.g. temperature meters, of the same type.

SUMMARY

Current IoT systems are not very flexible when it comes to the purpose of the devices. IoT Devices are designed with a single purpose in mind; an alarm is designed to emit a loud noise if they detect smoke, and a light just illuminates when a switch is pressed.

It is therefore an object of embodiments herein to further improve flexibility and versatility of communications networks such as e.g. IoT systems.

According to a first aspect of embodiments herein, the object is achieved by a method performed by a first communication device, for identifying at least one second communication device each second communication device providing a respective semantic representation. The first communication device and a number of second communication devices operate in a communications network.

The first communication device decides a target semantic representation. The first communication device further decides a threshold related to a tolerated semantic distance between a semantic representation and the target semantic representation.

The first communication device sends to one or more network devices in the communications network, a request for any one or more second communication devices out of the number of second communication devices, providing a semantic representation having a semantic distance below the decided threshold. The first communication device then receives from any of the one or more network devices a message identifying at least one second communication device providing a semantic representation according to the request.

According to a second aspect of embodiments herein, the object is achieved by a method performed by a network device for identifying at least one second communication device each second communication device providing a respective semantic representation. The first communication device and a number of second communication devices operate in a communications network. The network device receives from the first communication device, a request for any one or more second communication devices out of the number of second communication devices providing a semantic representation having a semantic distance to the target semantic representation below a decided threshold. The threshold relates to a tolerated semantic distance between a semantic representation and a target semantic representation. The target semantic representation is decided by the first communication device.

Based on determining for each of at least one of the number of second communication devices, a semantic representation and a semantic distance between the target semantic representation and the determined semantic representation, the network device identifies any second communication device providing a semantic representation according to the request. The network device then sends to the first communication device, a message identifying at least one second communication device providing a semantic representation according to the request.

According to a third aspect of embodiments herein, the object is achieved by a first communication device for identifying at least one second communication device each second communication device providing a respective semantic representation, which first communication device and a number of second communication devices are operable in a communications network, the first communication device being configured to:

Decide a target semantic representation,
decide a threshold related to a tolerated semantic distance between a semantic representation and the target semantic representation,
send to one or more network devices in the communications network 100, a request for any one or more second communication devices out of the number of second communication devices, providing a semantic representation having a semantic distance below the decided threshold, and
receive from any of the one or more network devices a message identifying at least one second communication device providing a semantic representation according to the request.

According to a fourth aspect of embodiments herein, the object is achieved by a network device for identifying at least one second communication device each second communication device providing a respective semantic representation. A first communication device and a number of second communication devices are operable in a communications network. The network device being configured to:

Receive from the first communication device, a request for any one or more second communication devices out of the number of second communication devices, providing a semantic representation having a semantic distance to the target semantic representation below a decided threshold, which threshold is adapted to relate to a tolerated semantic distance between a semantic representation and a target semantic representation, which target semantic representation is decided by the first communication device,
based on determining for each of at least one of the number of second communication devices, a semantic representation and a semantic distance between the target semantic representation and the determined semantic representation, identify at least one second communication device providing a semantic representation according to the request, and
send to the first communication device, a message identifying at least one second communication device providing a semantic representation according to the request.

Since the threshold and the target semantic representation, e.g. relating to the first communication device or a specified ideal communication device, are sent to second communication devices in the communications network, the first communication device can identify second communication devices providing a tolerated semantic distance, i.e. second communication devices that are enough similar to the first communication device or the specified ideal communication device. When identified, the first communication device may use these similar communication devices for other purposes than they are originally designed for resulting a communication network providing improved flexibility and versatility.

The wording "specified ideal communication device" when used herein means a device that has the properties that best can fulfil the actuation need of the first communication device 121, thus an ideal communication device specified by the first communication device 121. The specified ideal communication device does not necessarily as such correspond to a communication device present in the communication network 100, but rather expresses a wish of the most suitable device as defined by the first communication device 121.

An advantage with embodiments herein is that they enable integration of a variety of devices into a larger system, going beyond the functions a device was originally designed for. They further enable new forms of applications.

A further advantage with embodiments herein is that they are simple to implement and uses current standard protocols making it possible to be adapted by already existing devices and systems.

A further advantage with embodiments herein is that they simplify the interoperability between devices from different manufacturers, devices for different application areas and industries, and devices from different periods of time.

BRIEF DESCRIPTION OF THE DRAWINGS

Examples of embodiments herein are described in more detail with reference to attached drawings in which.

DETAILED DESCRIPTION

Embodiments herein enable communication networks such as IoT to create new, unpredictable uses for existing deployed devices that in a generalized form.

Embodiments herein provide a mechanism for enable actuation on the basis of wider semantics than the original intended purpose.

The term actuation when used herein means to cause a device to perform an action, typically physically interacting with its surrounding, such as controlling a motor, controlling a light or controlling a sound generator.

Embodiments herein provide a mechanism to use data semantics in communication systems such as e.g. IoT systems to enable addressing a set of communication devices such as M2M devices based on a generalized resource specification. This removes the need to know exactly the type and identity of the addressed devices. The mechanism uses the concept of Semantic Distance, measuring the similarity of the resources and objects provided by two devices. A low Semantic Distance when used in examples in this document implies a high similarity. However, it may be defined the other way around, wherein a high Semantic Distance implies a high similarity. This allows a communication device to identify the surrounding communication devices that have very similar objects and resources as itself. Alternatively, it allows a communication device to identify the surrounding communication devices with objects and resources similar to a specified target profile. This approach lets the communication devices and/or actuators perform actuations on devices different than what they are configured for, such as e.g. using computer speakers for fire alarm, and creates a way for fully interactive and interoperable IoT systems. The term actuator when used herein means a device able to perform actions, typically physical, such as emitting light, producing sound or controlling a motor.

Figure 1:
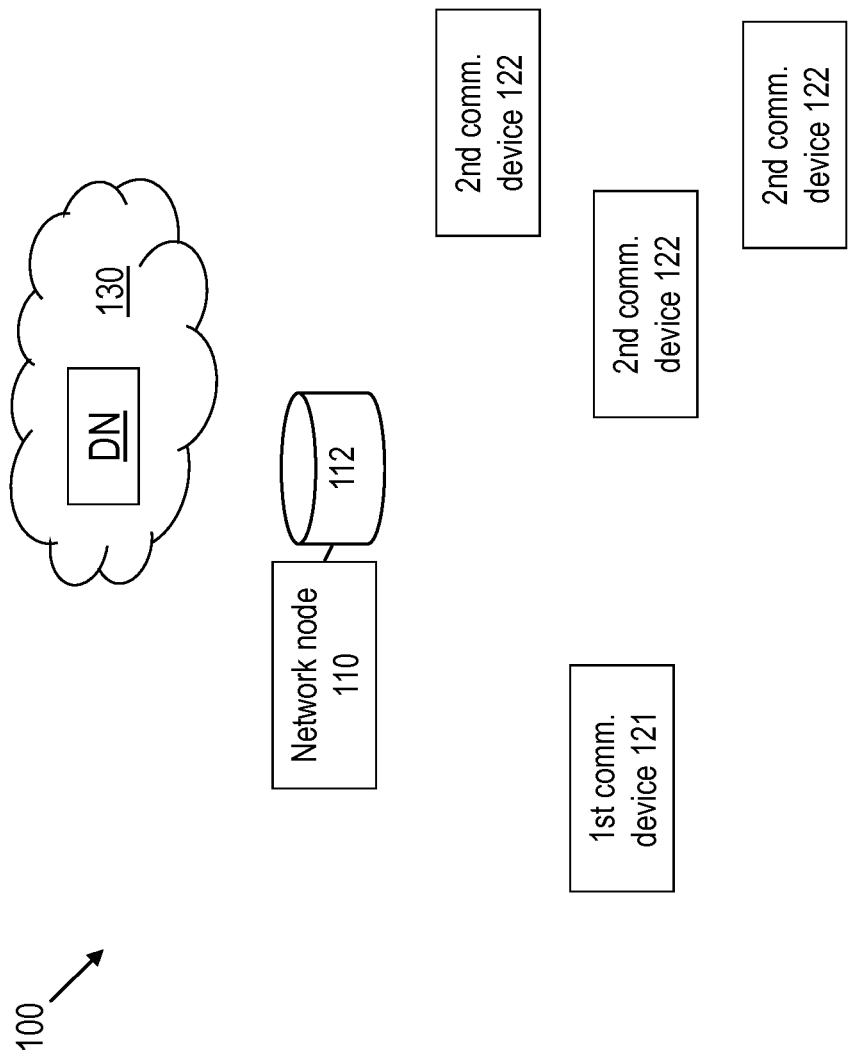
FIG. 1 is a schematic block diagram illustrating embodiments of a communications network.

FIG. 1 depicts an example of a communications network 100 in which embodiments herein may be implemented. The communication network 100 may use a number of different technologies, e.g. short range technologies such as Bluetooth, and ZigBee or other any short range technologies, Wi-Fi, Long Term Evolution (LTE), LTE-Advanced, 5G, Wideband Code Division Multiple Access (WCDMA), Global System for Mobile communications/enhanced Data rate for GSM Evolution (GSM/EDGE), Worldwide Interoperability for Microwave Access (WiMax), or Ultra Mobile Broadband (UMB), just to mention a few possible implementations. Embodiments herein relate to recent technology trends that are of particular interest in a 5G context, such as tight interworking between LTE and 5G. However, embodiments are also applicable in further development of other existing wireless communication systems such as e.g. WCDMA and LTE.

Network nodes operate in the communication network 100 such as the network node 110 depicted in FIG. 1. The network node 110 may be accessible to a directory 112 comprising information about one or more second communication devices 122 and their respective semantic representation. The use of this will be described more in detail below. The network node 110 may be a mobile station Access Point (AP), a mobile station (STA), a IoT gateway. The directory 112 may be any type of suitable directory such as e.g. be a CoAP's Resource Directory (RD). The directory 112 may be a unit of its own, be comprised in the network node 110 or in any other suitable network node.

Communication devices operate in the communication network 100, such as e.g. a first communication device 121 and a number of second communication devices 122 depicted in FIG. 1. The first and second communication devices 121, 122 may be IoT devices, UEs, mobile station a non-access point (non-AP) STA, a STA, a user equipment and/or a wireless terminals, communicate via one or more Access Networks (AN), e.g. RAN, to one or more core networks (CN). It should be understood by the skilled in the art that "communication device" is a non-limiting term which means any terminal, wireless communication terminal, user equipment, Machine Type Communication (MTC) device, Device to Device (D2D) terminal, or node e.g. smart phone, laptop, mobile phone, sensor, relay, mobile tablets or even a small base station communicating within a cell.

The number of second communication devices 122 and in some embodiments also the first communication device 121 each provides respective semantic representation which will be described below.

As mentioned above, embodiments herein enables new ways of using the first and second communication devices 121, 122 such as e.g. being IoT devices, in diverse systems for different purposes than the pre-configured ones.

Some of the embodiments of method actions are performed by a network device 110, 122. The network device 110, 122 is represented by either the network node 110 or the second communication device 122. Thus the method may be performed in any of the network node 110 and the second communication device 122.

Some method actions may be performed by the network node 110. As an alternative, a Distributed Node (DN) and functionality, e.g. comprised in a cloud 130 as shown in FIG. 1, may be used for performing or partly performing some method actions.

As mentioned above, embodiments herein enable new innovative ways of using communication devices such as the first and second communication devices 121, 122 e.g. being IoT devices, in diverse systems for different purposes than the pre-configured ones.

The communication devices such as the first and second communication devices 121, 122 are not required to understand specific semantics or meaning of resources, thus being very lightweight to implement even in communication networks comprising constrained networks.

Embodiments herein requires a very simple implementation on the first and second communication devices 121, 122 to understand the actuation and accordingly the semantic distance parameter.

A sample use case would be a fire or burglary alarm at night. With this system, the first communication device 121 will be a fire detector or motion detector that will be configured to indicate an alarm using all available second communication devices 122 devices that can present such an indication, herein referred to as semantic representation. These second communication devices 122 devices may include the lights, monitors and any other form of light which will switch on when the alarm triggers will blink if they have that capability. Similarly second communication devices 122 being a home audio system or phones may also act as an alarm speaker in that scenario.

Another example might be when the first communication device 121 is part of a monitoring system that reads data from all second communication devices 122 that can provide any kind of semantic representation such as environmental data e.g. temperature, humidity, etc., and alarm if there are sudden changes in their provided values. The system does not need to be configured with the exact devices or exact resources that it monitors.

Figure 2:
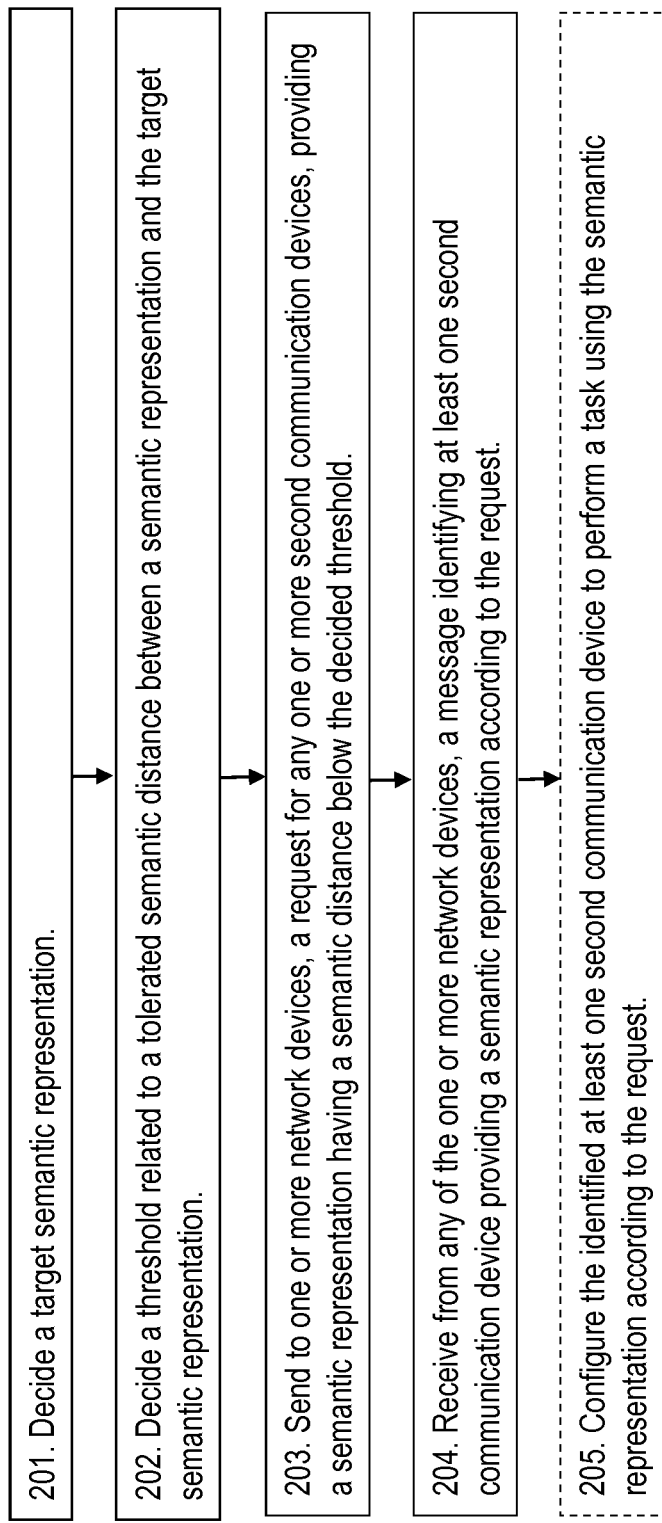
FIG. 2 is a flowchart depicting embodiments of a method in a first communication device.

Example embodiments of a method performed by the first communication device 121, for identifying at least one second communication device 122 each second communication device providing a respective semantic representation, will be described with reference to a flowchart depicted in FIG. 2. As mentioned above the first communication device 121 and a number of second communication devices 122 operate in the communications network 100.

The method comprises the following actions, which actions may be taken in any suitable order. Actions that are optional are presented in dashed boxes in FIG. 2.

Action 201

According to an example scenario, the first communication device 121 wishes to find one or more second communication devices 122 providing a resource defined in terms of a semantic representation to be used for a specific purpose. The first communication device 121 therefore need to define the characteristics of, i.e. specify an ideal wished communication device, here referred to as a target semantic representation, and then try to identify second communication devices 122 that are as similar as possible to the ideal wished communication device. In some embodiments, the first communication device 121 wishes to find one or more second communication devices 122 providing a resource defined in terms of a semantic representation that is as similar as possible as the first communication device 121 itself. A use case will be described below.

Thus the first communication device 121 decides a target semantic representation. This may be performed by the means of a software configuration in the first communication device 121 depending on the type of actuation to perform on the second devices 122.

The target semantic representation may thus be related to any one out of: The first communication device 121, and the specified ideal communication device.

Action 202

According to the example scenario, the first communication device 121 may not find any second communication device 122 that is identical to the ideal wished communication device. The first communication device 121 therefore will specify an accepted similarity between the second communication devices 122 and the ideal wished communication device, in terms of a tolerated semantic distance.

Thus the first communication device 121 decides a threshold related to a tolerated semantic distance between a semantic representation and the target semantic representation. This may be performed by programming the first communication device 121 with a predefined threshold determined by the flexibility in variety of target devices, or alternatively, by learning the threshold via the previous searches. In the latter case, the threshold is increased if the previous search did not return a sufficient number of second communication devices.

Some examples thresholds are 0.1 for locating devices very similar to the target semantic representation, used when a rather specific kind of devices are needed but may vary in e.g. brand or model, 0.5 for a very wide range of second communication devices, e.g. for a fire alarm when almost any device able to output an alarm indication is accepted.

Action 203

The first communication device 121 now wish to receive information identifying the second communication devices 122 that have an accepted similarity with the ideal wished communication device, in terms of a tolerated semantic distance. It therefore sends a request for such information to one or more network devices 110, 122.

Therefore the first communication device 121 sends to one or more network devices 110, 122 in the communications network 100, a request for any one or more second communication devices 122 out of the number of second communication devices 122, providing a semantic representation having a semantic distance below the decided threshold. I. e., in some embodiments the request is sent to the network node 110 being accessible to the directory 112 comprising information about the one or more second communication devices 122 and their respective semantic representation. In some other embodiments the request is sent to all respective second communication devices 122 knowing its own respective semantic representation.

The request may comprise information about the target semantic representation and the decided threshold.

Thus the one or more network devices 110, 122 in the communications network 100 may comprise any one or more out of: A network node 110 being accessible to a directory 112 comprising information about the one or more second communication devices 122 and their respective semantic representation, and the number of second communication devices 122.

Action 204

The first communication device 121 then receives response to the request from one or more network devices 110, 122. The first communication device 121 thus receives a message from any of the one or more network devices 110, 122. The message identifies at least one second communication device 122 providing a semantic representation according to the request.

The received message identifying the at least one second communication device 122, may comprise addresses of the at least one identified second communication device 122. Such addresses may e.g. be Internet Protocol (IP) addresses, Medium Access Control (MAC) addresses, or Uniform Resource Identifiers (URI).

In some embodiments, e.g. wherein the network devices are represented by the number of second communication devices 122, the received message identifying the at least one second communication device 122, comprises receiving a message from each of the at least one second communication device 122 providing a semantic representation according to the request.

Action 205

The first communication device 121 may then configure the identified at least one second communication device 122 to perform a task using the semantic representation according to the request. For example, a search on devices semantically similar to a light might return a light bulb and a display device. The task may be e.g. to switch on the light.

This may be performed by sending a message to the obtained address in order to perform the actuation. The message may be a CoAP message, e.g. to the address in a URI format coap://10.0.0.1:5683/light in order to turn on a light on the device.

Figure 3:
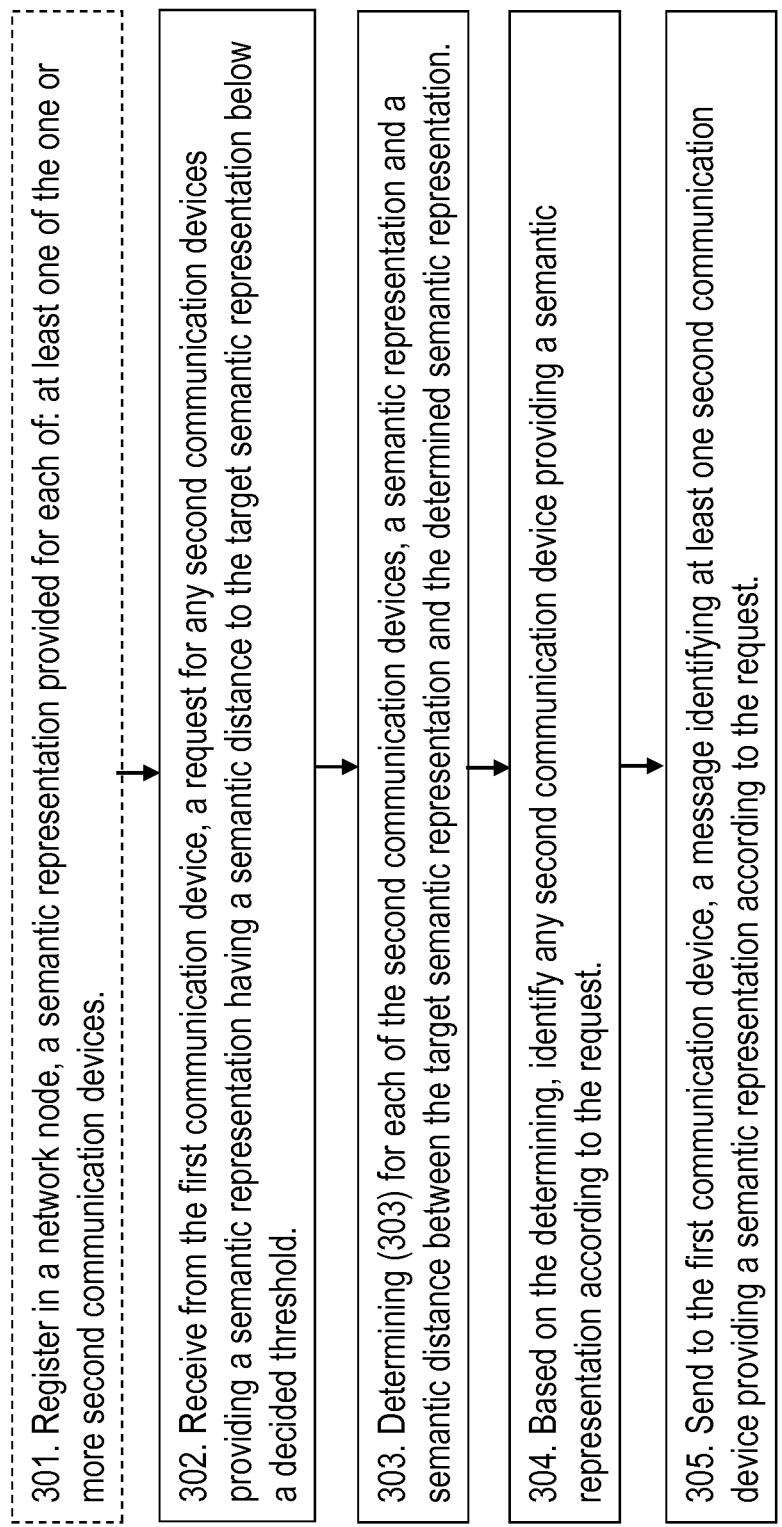
FIG. 3 is a flowchart depicting embodiments of a method in a network device.

Example embodiments of a method performed by a network device 110, 122, for identifying at least one second communication device 122 each second communication device providing respective semantic representation, will be described with reference to a flowchart depicted in FIG. 3. As mentioned above the first communication device 121 and the number of second communication devices 122 operate in a communications network 100.

In some embodiments, the network device 110, 122 in the communications network 100 is represented by a network node 110. The network node 110 is accessible to a directory 112 comprising information about the one or more second communication devices 122 and their respective semantic representation.

In some alternative embodiments, the network device 110, 122 in the communications network 100 is represented by one of the number of second communication devices 122.

The method comprises the following actions, which actions may be taken in any suitable order. Actions that are optional are presented in dashed boxes in FIG. 3.

Action 301

In some embodiments, the network device 110, 122, registers in the network node 110, a semantic representation provided for each of: at least one of the one or more second communication devices 122. This may be performed e.g. by the second wireless device 122 sending a message to the network node 110 for registering its semantic representation. The message comprises information about the semantic representation provided for the this second communication device 122. This may be performed by all the second communication devices 122.

In some embodiments wherein the network device 110, 122 is a network node, the network node 110 collects from the second communication devices 122, information about the semantic representation provided for each of them.

As mentioned above, the network node 110 may be accessible to the directory 112 comprising information about one or more second communication devices 122 and their respective semantic representation. The semantic representation provided for each of the at least one of the one or more second communication devices 122 may be registered by the network node 110 in the directory 112.

Action 302

The network device 110, 122, receives from the first communication device 121, the request for any one or more second communication devices 122 out of the number of second communication devices 122, providing a semantic representation having a semantic distance to the target semantic representation below a decided threshold. The threshold relates to the tolerated semantic distance between a semantic representation and a target semantic representation. As mentioned in action 201, the target semantic representation is decided by the first communication device 121.

The target semantic representation may be related to any one out of: The first communication device 121, and the specified ideal communication device.

In the embodiments wherein the network device 110, 122 in the communications network 100 is represented by one of the number of second communication devices 122, the request may be received from the first communication device 121 in any one out of: a broadcast and a multicast.

Action 303

The network device 110, 122, determines for each of at least one of the number of second communication devices 122, a semantic representation and a semantic distance between the target semantic representation and the determined semantic representation.

In embodiments wherein the network device 110, 122 is a network node 110, this may be performed by obtaining the information from the directory 112.

In embodiments wherein the network device 110, 122 is a second communication device 122, this may e.g. be performed by knowing the information and stored in a memory and obtain it from there.

Action 304

Based on the for each of at least one of the number of second communication devices 122, determined semantic representation and semantic distance between the target semantic representation and the determined semantic representation mentioned above, the network device 110, 122 identifies any second communication device 122 providing a semantic representation according to the request.

In embodiments wherein the network device 110, 122 is a network node 110, this may be performed by identifying any second communication device 122 providing a semantic representation according to the request.

In embodiments wherein the network device 110, 122 is a second communication device 122, this may e.g. be performed identify whether second communication device 122 itself provides a semantic representation according to the request.

Action 305

The network device 110, 122, will then report the result comprising the identified second communication devices 122 fulfilling the request. It thus sends to the first communication device 121, a message identifying at least one second communication device 122 providing a semantic representation according to the request.

Action 306

In some embodiments wherein network device 110 is represented by one of the number of second communication devices 122 have been identified as one of the at least one second communication device 122 to perform a task using the semantic representation according to the request, it may be configured by the first communication device 121.

The embodiments of the methods described above will now be exemplified and described more in detail. The description below may refer to any embodiment above.

Embodiments herein uses the concept of Semantic Distance which will be explained by way of introduction.

Semantic Distance

Semantic distance is a way to calculate how related two resources are. Resources in the traditional context are web resources, those resources may be anything from an HTML website to a video file, a profile page or an audio file. This concept is used extensible in Artificial Intelligence (AI) systems that use machine-understandable formats, such as e.g. Resource Description Framework (RDF) to provide related resources. Measuring the distance between resources and identifying how related they are become fundamental in order to provide recommendations to the user such as e.g. relating to music, Facebook profiles, websites, etc.

In the context of IoT, there is not yet such a large effort defining Semantic distance since the device semantics are not yet mature. There are multiple data models for communication devices and they are not semantically very expressive.

Nowadays there are few organizations working on IoT semantics, World Wide Web Consortium (W3C)-WoT, Schema.org, IPSO and IETF provide various object models. They are used to define communication devices in a unique way, for example IPSO defines a temperature sensor with a concrete Object ID, the number 3303. There is no room for confusion about the device semantics when such Object ID is received.

The algorithm for calculating semantic distance between the resources of two communication devices is out of the scope of embodiments herein. There are multiple possible ways to calculate the semantic distance and new ways are expected to be defined. For the sake of understanding the embodiments herein, a simplistic way would be to compare every resource of one device with every resource of the second device, and for each pair weight the different resource properties such as identity, name, unit, etc. that are similar.

As mentioned above, embodiments herein apply the concept of semantic distance for specific IoT applications, giving new usability to communication devices such as the second communication devices 122 that are semantically similar. What this means is that communication devices that are originally designed for one purpose such as e.g. a laptop headphones, a light bulb, may be used for a different purpose such as e.g. i.e. alarm audio, blinking lights, without specifically configuring them for each specific situation.

An example embodiment of the methods herein is below defined for CoAP and LWM2M/IPSO as an example, but it may be extended to any other data model or protocol.

Device Registration

Figure 4:
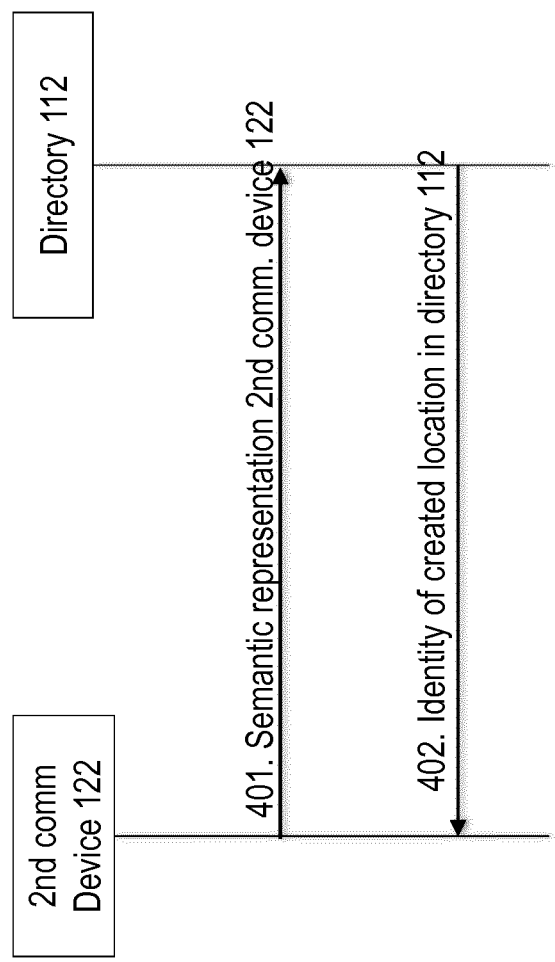
FIG. 4 is a sequence diagram depicting embodiments of a method.

This relates to Action 301 described above. LWM2M uses CoAP's Resource Directory (RD) for a registration interface. The RD may be a server storing descriptions of resources held on devices such as storing the semantic representation of the number of second communication devices 122. Therefore lookups may return links to where those resources are stored, not the resource itself. In some embodiments, the registration process is the same as with standard CoAP, but for the example scenario IPSO Objects are registered, see FIG. 4. FIG. 4 illustrates one of the second communication devices 122 that in this example is a IoT device, UE, mobile station a non-access point (non-AP) STA, a STA, a user equipment and/or a wireless terminal registering sematic representation 401 in the form of IPSO objects in the directory 112 such as a RD for semantic distance calculation. A location such as an URL to which the second communication device 122 may send registration updates in the directory 112 may be fed back 402 to the second communication devices 122.

This part of the registration is advantageous because while LWM2M Objects have fixed resources, IPSO based Objects use composition. This means that while LWM2M Objects are composed of fixed in-mutable resources, IPSO ones may be rearranged to fix various devices. While LWM2M Security always has resources (0, 1, 2, 3, 4) and it is possible to make a new IPSO Object composed of any wanted resources.

This means that a valid IPSO Object may be composed of multiple different resources that need to be registered too. Especially for the cases when the Object ID is not well known, the second communication device 122 is defined by its atomic resources. The concept of composition applies across object models according to embodiments herein.

These registered semantic representations, such as resources, on the RD will later on be used for calculating the semantic distance between different objects and resources.

Distance Calculation

This relates to Action 303 described above, wherein the network device 110, 122 such as the network node 110 or the second communication device 122 determines for each of at least one of the number of second communication devices (122), a semantic distance between the target semantic representation and the determined semantic representation.

There are multiple algorithms to determine, also referred to as calculate, the semantic distance between two devices but this is out of the scope of embodiments herein. In some embodiments, there may be methods implemented to calculate the semantic distance between IPSO objects for example. The semantic distance calculation algorithm may be known to all the nodes such as the second communication devices 122 and the resource directory 112 in the communication network 100 implementing the embodiments herein so that interoperability between nodes is satisfied such as between the first communication device 121, the second communication devices 122, and the network node 110. In some embodiments, the output of such a distance calculation may be a decimal number indicating the similarity from 0 (identical) to infinity (nothing in common). However, embodiments herein are independent of the kind of metrics used.

Three examples semantically similar second communication devices 122 may refer to the following: An IPSO Light control of what could be a modern Smart light that has color and dimming intensity, a Monitor or TV light control that specifies whether it can be switched on/off, contrast, brightness, etc. and a Simple led light, as on the home or on electro domestic LEDs.

Addressing Semantically Close Devices

This relates to Action 204, 205 and 306 described above. The first communication device 121 may address the second communication devices 122 that are semantically close, also referred to as similar, to itself or to a specified ideal communication device. Finding such a communication device allows the first communication device 121, to carry out actuation on, i.e. to cause the addressed second communication devices 122 to perform actions, to set a configuration parameter of the addressed second communication devices 122 or to cause the addressed second communication device 122 to report sensor readings. In the examples below, actuation is assumed, as this is the primary use case. Actuation typically causes the device to perform actions in order to interact with its surrounding, such as controlling a light, controlling a sound generator or speaker, or controlling a motor. In the example, it is also assumed that the first communication device 121 looks for the second communication devices 122 that are semantically close to the first communication device 121, i.e. the ideal communication device is specified to be similar to the first communication device 121.

The first communication device 121 may e.g. sends a request in two ways: By sending an actuation command with the search embedded, and by sending first a search, then sending the actuation command to the found devices. When a device such as the first communication device 121 sends the request such as an actuation command to a group of second communication devices 122, e.g. multicast address, CoAP group or other types of aggregation, it may specify the threshold related to the tolerated semantic distance between a semantic representation of a second communication device 122 and the target semantic representation, in this example referred to as the tolerated Semantic Distance (tSD) that such actuation tolerates. The second communication device 122 receiving the requested target semantic representation and the tSD will then read the actuation also referred to as the target semantic representation, that it will be able to execute only partially. This is since the semantic representation of the second communication device 122, does not fully represent the target semantic representation, i.e. the Object definition does not fully represent the expected Object. the second communication device 122 will execute the requested target semantic representation such as the actuation command providing that the threshold related to the tolerated semantic distance between a semantic representation and the target semantic representation is not exceeded, i.e. the tSD<SD on that second communication device 122, that is it will execute providing the second communication device 122 is similar enough.

The first communication device 121 may access the addressed second communication devices 122 in two several ways, explained in below.

Addressing Using a Resource Directory.

In this embodiment, the first communication device 121 contacts the directory 112, such as the Resource Directory, in order to locate the second communication devices 122 that are semantically close, also referred to as similar, to itself or to a specified ideal communication device. The request sent to the directory 112 comprises the target semantic representation also referred to as the target object, i.e. the desired semantic representation or the sending devices semantic representation itself, and the threshold related to the tolerated semantic distance also referred to as the tSD. The directory 112, such as the Resource Directory replies with the addresses of the all addressed second communication devices 122 for which SD lower than tSD or equal to tSD. This embodiment is presented in FIG. 5.

Figure 5:
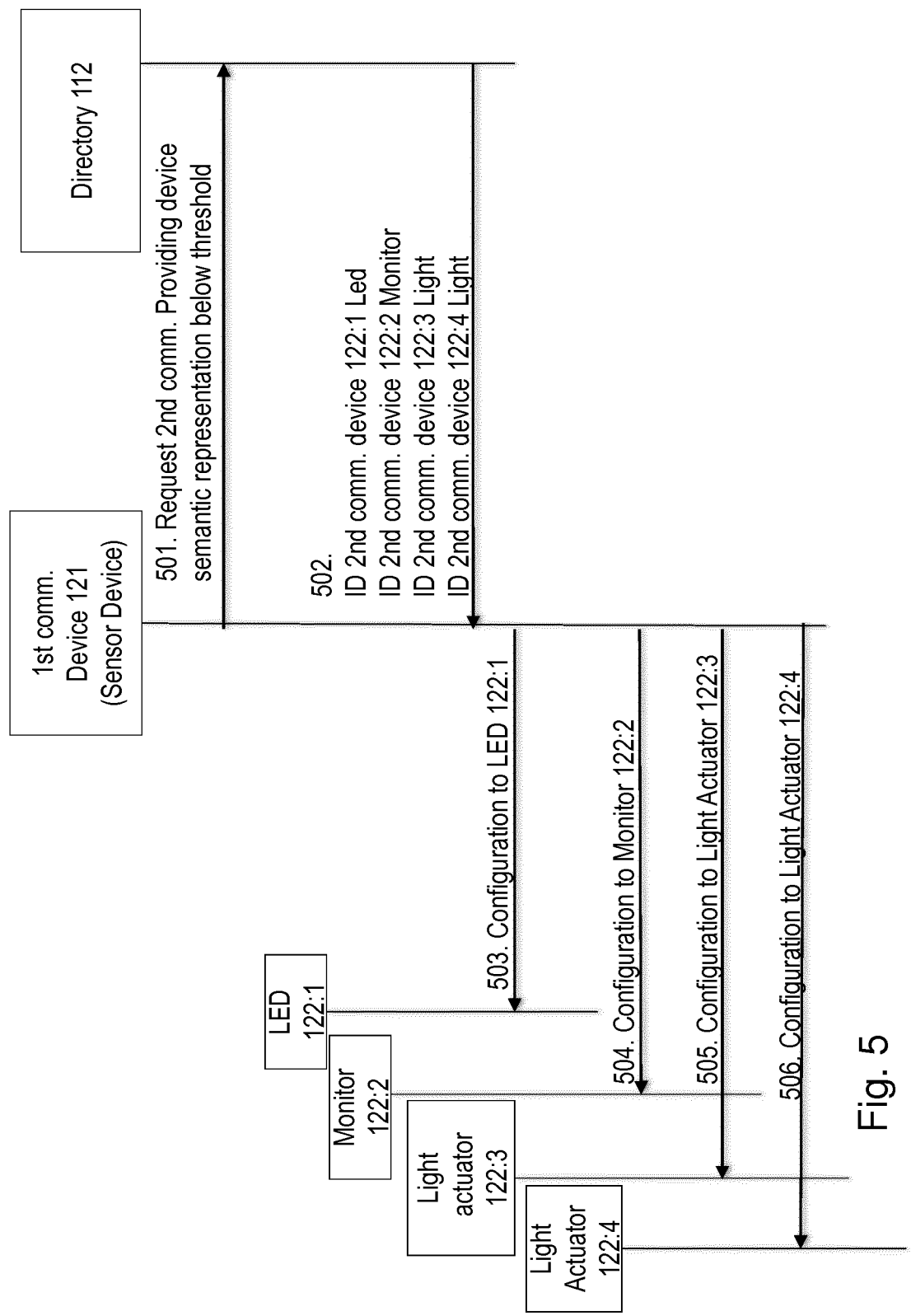
FIG. 5 is a sequence diagram depicting embodiments of a method.

FIG. 5 depicts the first communication device 121 in this example represented by a CoAP device such as the first communication device 121 using the directory 112 such as the resource directory by sending a request 501 to retrieve 502 an indication of any second communication device 122 providing a similar semantic representation, in this example semantically close to the Object with ID 3311 named Light Control actuator, and sending unicast actuation requests to each address returned by the directory 112. In this example four second communication devices 122 were identified similar to the Light Control actuator, the second communication devices 122:1 being a Led light, 122:2 being a Monitor, 122:3 being a Light actuator, and 122,4 also being a Light actuator. The response from the directory 112 includes the address of each of the second communication devices 122. The first communication device may then send 503-506, a configuration to perform a task using the semantic representation according to the request to the second communication devices 122:1, 2, 3 and 4, which in this example may be to switch on the light.

Addressing Using Multicast or Broadcast.

Figure 6:
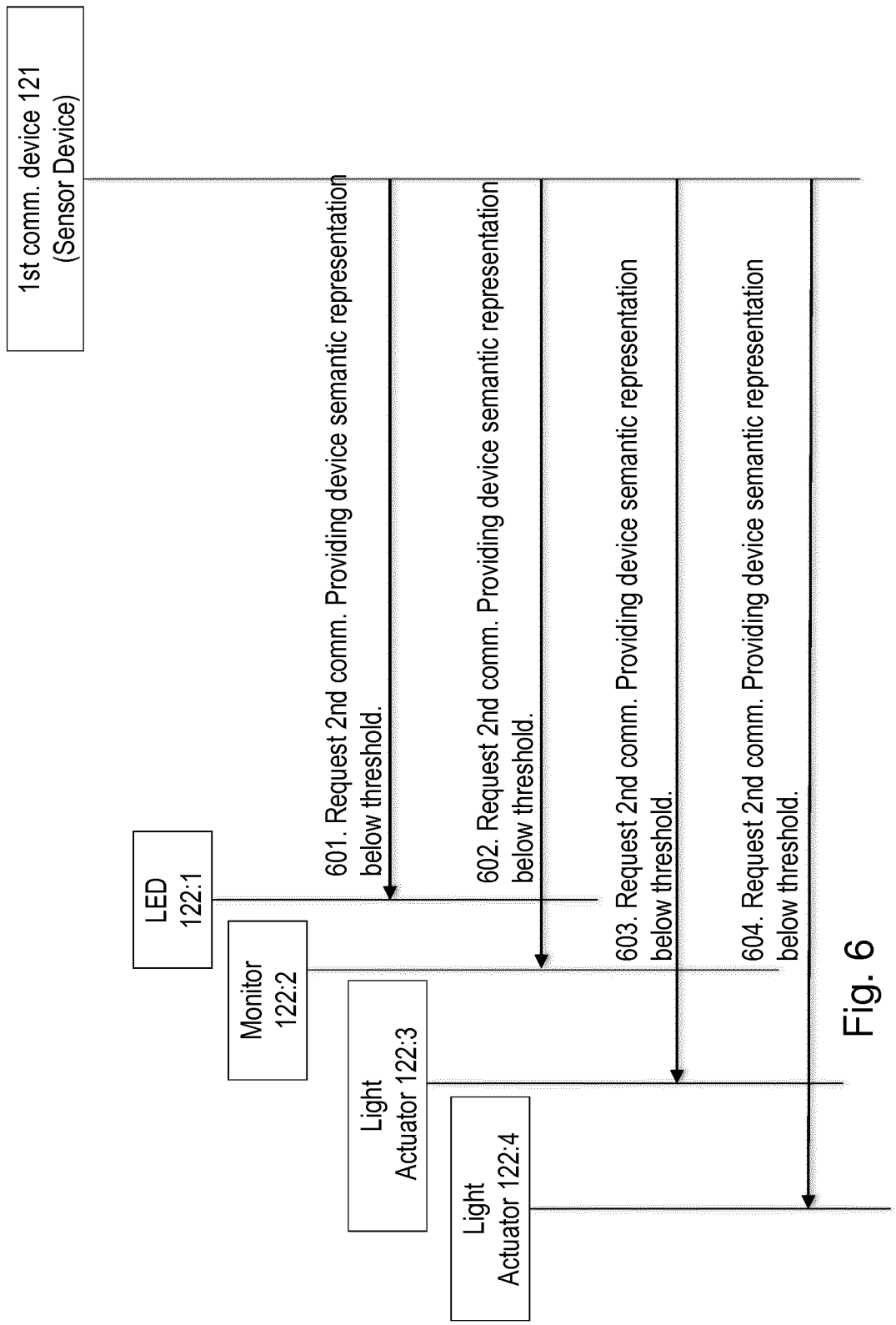
FIG. 6 is a sequence diagram depicting embodiments of a method.

In this embodiment, the first communication device 121 sends a multicast or broadcast message to all the second communication devices 122 in the communication network 100. The message comprises the target semantic representation also referred to as the target object, i.e. the desired semantic representation or the sending devices semantic representation itself, and the threshold related to the tolerated semantic distance also referred to as the tSD. Each second communication device 122 receiving this message compares the semantic distance between themselves and the indicated target object to see if they are addressed. Only the second communication devices 122 for which the semantic distance is less than tSD or equal to the tSD processes the message. This embodiment is presented in FIG. 6. FIG. 6 illustrates the first communication device 121, in this example a CoAP device using multicast to send to the request for second communication devices 122 providing a semantic representation having a semantic distance below the decided threshold, i.e. in this example, send an actuation request to the second communication devices 122 that are semantically close to the Object with ID 3311 named Light Control actuator in this case.

FIG. 6 depicts the first communication device 121 in this example represented by a CoAP device such as the first communication device 121 sending a request 601-604, in a broadcast message to retrieve an indication of any second communication device 122 providing a similar semantic representation, in this example semantically close to a Light Control actuator. The CoAP device such as the first communication device 121 may send in the same broadcast a configuration to perform a task if the requirement on semantic distance in the request is fulfilled, using the semantic representation and the tSD according to the request, which in this example may be to switch on the light. In this example four second communication devices 122 were identified similar to the Light Control actuator, the second communication devices 122:1 being a Led light, 122:2 being a Monitor, 122:3 being a Light actuator, and 122, 4 also being a Light actuator.

According to embodiments herein, the aim of first communication device 121 is to find and inform a second communication device 122 to perform actuations different than what they are configured for. Such as, when there is a fire alarm, the first communication device 121 may ask a second communication device 122 e.g. being a computer which is in the same room as the first communication device 121, to work as a speaker and/or a lamp which is in the room to blink. This means that when identified, the first communication device 121 may use these similar communication devices for other purposes than they are originally designed for resulting a communication network providing improved flexibility and versatility. Please note that according to embodiments herein, it is should be ensured that the first communication device 121 will use any second communication device 122 in a safe way. The first communication device 121 shall only use the second communication device 122 for other purposes than they are originally designed when it's necessary and it should be ensured that every second communication device 122 can work well as their originally designed when there is no special happening such as e.g. a fire alarm.

Figure 7:
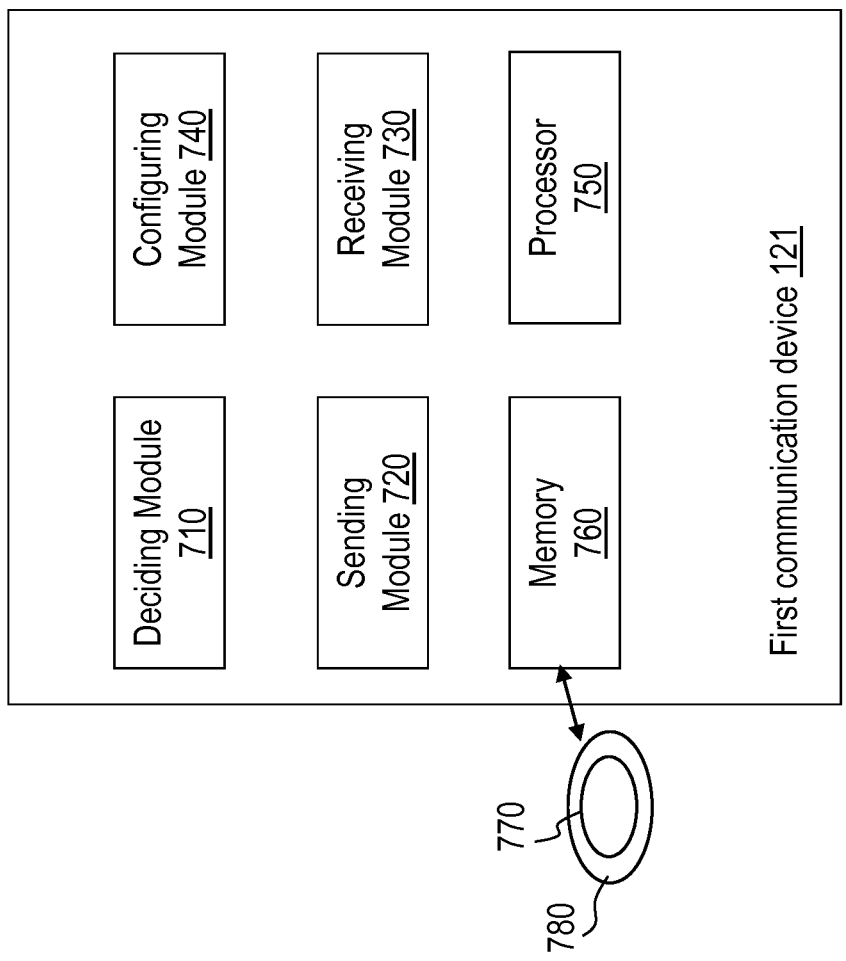
FIG. 7 is a schematic block diagram illustrating embodiments of a first communication device.

To perform the method actions for identifying at least one second communication device 122 each second communication device providing respective semantic representation, the first communication device 121 may comprise the following arrangement depicted in FIG. 7. As mentioned above, the first communication device 121 and the number of second communication devices 122 are operable in a communications network 100.

The first communication device 121 is configured to, e.g. by means of a deciding module 710 configured to, decide a target semantic representation.

The target semantic representation may be related to any one out of: The first communication device 121, and a specified ideal communication device.

The first communication device 121 is further configured to, e.g. by means of the deciding module 710 configured to, decide a threshold related to a tolerated semantic distance between a semantic representation and the target semantic representation.

The first communication device 121 is further configured to, e.g. by means of a sending module 720 configured to, send to one or more network devices 110, 122 in the communications network 100, a request for any one or more second communication devices 122 out of the number of second communication devices 122, providing a semantic representation having a semantic distance below the decided threshold.

The first communication device 121 is further configured to, e.g. by means of a receiving module 730 configured to, receive from any of the one or more network devices 110, 122, a message identifying at least one second communication device 122 providing a semantic representation according to the request.

In some embodiments, the received message identifying the at least one second communication device 122 is adapted to comprise addresses of the at least one identified second communication device 122.

In some embodiments, the received message identifying the at least one second communication device 122, is adapted to comprise receiving a message from each of the at least one second communication device 122 providing a semantic representation according to the request.

The one or more network devices 110, 122 in the communications network 100 may be adapted to comprise any one or more out of: The network node 110 being accessible to a directory 112 comprising information about the one or more second communication devices 122 and their respective semantic representation, and the number of second communication devices 122.

The first communication device 121 may further be configured to, e.g. by means of a configuring module 740 configured to, configure the identified at least one second communication device 122 to perform a task using the semantic representation according to the request.

The embodiments herein for identifying at least one second communication device 122 each second communication device providing respective semantic representation, may be implemented through one or more processors, such as the processor 750 of a processing circuitry in the first communication device 121 depicted in FIG. 7, together with computer program code for performing the functions and actions of the embodiments herein. The program code mentioned above may also be provided as a computer program product, for instance in the form of a data carrier carrying computer program code for performing the embodiments herein when being loaded into the first communication device 121. One such carrier may be in the form of a CD ROM disc. It is however feasible with other data carriers such as a memory stick. The computer program code may furthermore be provided as pure program code on a server and downloaded to the first communication device 121.

The first communication device 121 may further comprise a memory 760 comprising one or more memory units. The memory 760 comprises instructions executable by the processor 750.

The memory 760 is arranged to be used to store e.g. information about semantic representations, target semantic representations, thresholds, objects, resources, data, configurations, and applications to perform the methods herein when being executed in the first communication device 121.

In some embodiments, a computer program 770 comprises instructions, which when executed by the at least one processor 750, cause the at least one processor 750 to perform actions according to any of the Actions 201-205.

In some embodiments, a carrier 780 comprises the computer program 770, wherein the carrier is one of an electronic signal, an optical signal, an electromagnetic signal, a magnetic signal, an electric signal, a radio signal, a microwave signal, or a computer-readable storage medium.

Those skilled in the art will also appreciate that the modules in the first communication device 121 described above may refer to a combination of analog and digital circuits, and/or one or more processors configured with software and/or firmware, e.g. stored in the memory 760, that when executed by the one or more processors such as the processor 750 as described above. One or more of these processors, as well as the other digital hardware, may be included in a single Application-Specific Integrated Circuitry (ASIC), or several processors and various digital hardware may be distributed among several separate components, whether individually packaged or assembled into a system-on-a-chip (SoC).

Figure 8:
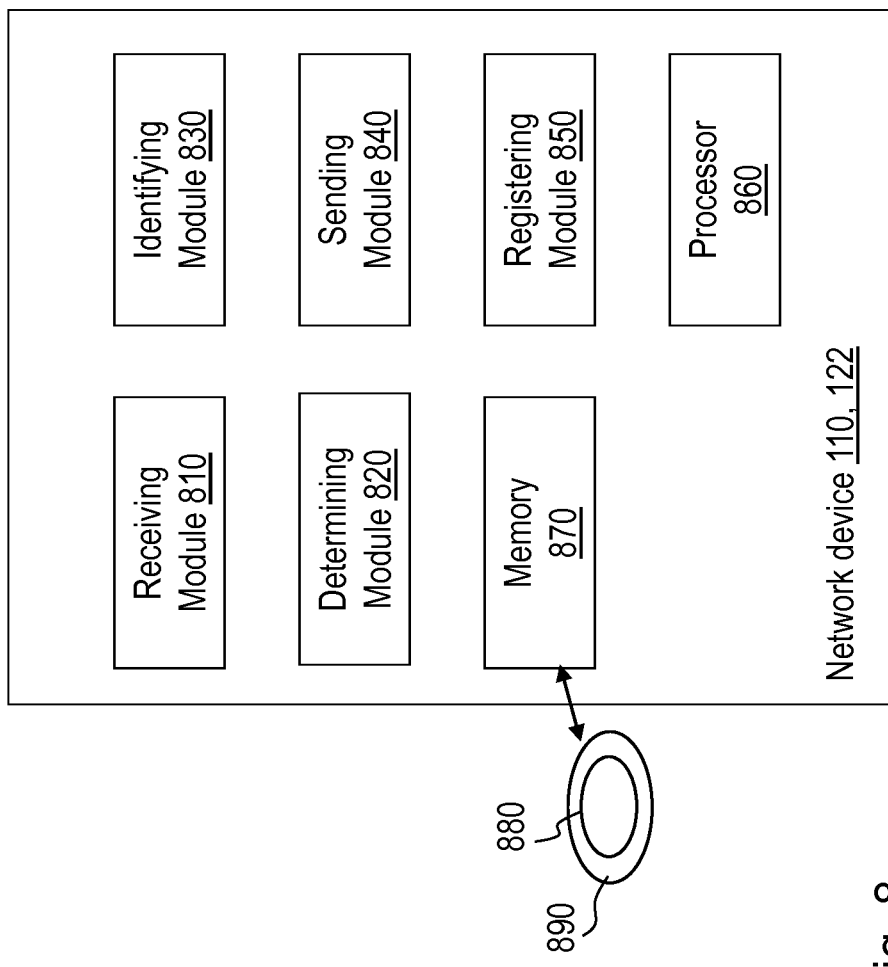
FIG. 8 is a schematic block diagram illustrating embodiments of a network device.

To perform the method actions for identifying at least one second communication device 122 each second communication device providing respective semantic representation, the network device 110, 122 may comprise the following arrangement depicted in FIG. 8. As mentioned above the first communication device 121 and the number of second communication devices 122 are operable in a communications network 100.

The network device 110, 122 is configured to, e.g. by means of a receiving module 810 adapted to, receive from the first communication device 121, a request for any one or more second communication devices 122 out of the number of second communication devices 122, providing a semantic representation having a semantic distance to the target semantic representation below a decided threshold. The threshold is adapted to relate to a tolerated semantic distance between a semantic representation and a target semantic representation. The target semantic representation is decided by the first communication device 121.

The target semantic representation may be related to any one out of: The first communication device 121, and a specified ideal communication device.

The network device 110, 122 is further configured to, e.g. by means of a determining module 820 adapted to, determining for each of at least one of the number of second communication devices 122, a semantic representation and a semantic distance between the target semantic representation and the determined semantic representation.

The network device 110, 122 is further configured to, based on determining for each of at least one of the number of second communication devices 122, a semantic representation and a semantic distance between the target semantic representation and the determined semantic representation, e.g. by means of an identifying module 830 adapted to, identify at least one second communication device 122 providing a semantic representation according to the request.

The network device 110, 122 is further configured to, e.g. by means of a sending module 840 adapted to, send to the first communication device 121, a message identifying at least one second communication device 122 providing a semantic representation according to the request.

The network device 110, 122 in the communications network 100 may be represented by a network node 110 being adapted to be accessible to a directory 112 comprising information about the one or more second communication devices 122 and their respective semantic representation.

In some embodiments, the network device 110, 122 in the communications network 100 is represented by one of the number of second communication devices 122. In these embodiments, the request may be adapted to be received, e.g. by means of the receiving module 810, from the first communication device 121 in any one out of: a broadcast and a multicast.

The network device 110, 122 may further be configured to, e.g. by means of a registering module 850 adapted to, register in a network node 110, a semantic representation provided for each of: at least one of the one or more second communication devices 122.

The embodiments herein for identifying at least one second communication device 122 each second communication device providing respective semantic representation, may be implemented through one or more processors, such as the processor 860 of a processing circuitry in the network device 110, 122 depicted in FIG. 8, together with computer program code for performing the functions and actions of the embodiments herein. The program code mentioned above may also be provided as a computer program product, for instance in the form of a data carrier carrying computer program code for performing the embodiments herein when being loaded into the network device 110, 122. One such carrier may be in the form of a CD ROM disc. It is however feasible with other data carriers such as a memory stick. The computer program code may furthermore be provided as pure program code on a server and downloaded to the network device 110, 122.

The network device 110, 122 may further comprise a memory 870 comprising one or more memory units. The memory 870 comprises instructions executable by the processor 860.

The memory 870 is arranged to be used to store e.g. information about semantic representations, target semantic representations, thresholds, objects, resources, data, configurations, and applications to perform the methods herein when being executed in the network device 110, 122.

In some embodiments, a computer program 880 comprises instructions, which when executed by the at least one processor 860, cause the at least one processor 860 to perform actions according to any of the Actions 301-305.

In some embodiments, a carrier 890 comprises the computer program 880, wherein the carrier is one of an electronic signal, an optical signal, an electromagnetic signal, a magnetic signal, an electric signal, a radio signal, a microwave signal, or a computer-readable storage medium.

Those skilled in the art will also appreciate that the modules in the network device 110, 122, described above may refer to a combination of analog and digital circuits, and/or one or more processors configured with software and/or firmware, e.g. stored in the memory 870, that when executed by the one or more processors such as the processor 860 as described above. One or more of these processors, as well as the other digital hardware, may be included in a single Application-Specific Integrated Circuitry (ASIC), or several processors and various digital hardware may be distributed among several separate components, whether individually packaged or assembled into a system-on-a-chip (SoC).

When using the word "comprise" or "comprising" it shall be interpreted as non-limiting, i.e. meaning "consist at least of".

The embodiments herein are not limited to the above described preferred embodiments. Various alternatives, modifications and equivalents may be used.

Therefore, the above embodiments should not be taken as limiting the scope of the invention, which is defined by the appending claims.

ABBREVIATIONS

Explain all abbreviations and acronyms used in the document.

| Abbreviation | Explanation |
| --- | --- |
| CoAP | Constrained Application Protocol |
| IoT | Internet of Things |
| IPSO | IP Smart Objects |
| LWM2M | Lightweight Machine-to-Machine Device Management Protocol |
| M2M | Machine-to-Machine |
| RD | Resource Directory |
| RDF | Resource Description Framework |
| SD | Semantic Distance |
| SenML | Sensor Markup Language |
| tSD | Tolerated Semantic Distance |
| WoT | Web of Things |

The invention claimed is:

1. A method performed by a first communication device, the method comprising:
deciding a target semantic representation;
deciding a threshold related to a tolerated semantic distance between a semantic representation and the target semantic representation;
sending to a network device a request for information identifying one or more communication devices that provide a semantic representation that satisfies a criteria, wherein the criteria is satisfied if a semantic distance between the provided semantic representation and the target semantic representation is below the decided threshold; and
after sending the request, receiving from the network device a message comprising an identifier identifying a second communication device that provides a semantic representation that satisfies the criteria.

2. The method of claim 1, wherein the network device is any of:
a network node being accessible to a directory comprising information about said one or more communication devices and their respective semantic representations, or
one of said one or more communication devices.

3. The method of claim 1, wherein the target semantic representation is related to any one out of:
the first communication device, and
a specified ideal communication device.

4. The method of claim 1, further comprising:
configuring the identified second communication device to perform according to the request a task using the semantic representation that satisfies the criteria.

5. A method performed by a network device, the method comprising:
receiving from a first communication device a request for information identifying one or more communication devices that provide a semantic representation that satisfies a criteria, wherein the criteria is satisfied if a semantic distance between the provided semantic representation and a target semantic representation is below a decided threshold, wherein the decided threshold relates to a tolerated semantic distance between a semantic representation and the target semantic representation, and further wherein the target semantic representation is decided by the first communication device;
after receiving the request, identifying a second communication device that provides a semantic representation that satisfies the criteria; and
sending to the first communication device a message comprising an identifier identifying the identified second communication device.

6. The method of claim 5, wherein the network device is represented by a network node being accessible to a directory comprising information about said one or more communication devices and their respective semantic representations.

7. The method of claim 5, wherein the network device is represented by one of said one or more communication devices and wherein the request is received from the first communication device in a broadcast or a multicast.

8. The method of claim 5, further comprising:
registering in a network node a semantic representation provided for each of said one or more communication devices.

9. The method of claim 5, wherein the target semantic representation is related to any one out of:
the first communication device, and
a specified ideal communication device.

10. A first communication device, the first communication device comprising a processor and a memory containing instructions executable by the processor, whereby the first communication device is configured to:
decide a target semantic representation;
decide a threshold related to a tolerated semantic distance between a semantic representation and the target semantic representation;
send to a network device a request for information identifying one or more communication devices that provide a semantic representation that satisfies a criteria, wherein the criteria is satisfied if a semantic distance between the provided semantic representation and the target semantic representation is below the decided threshold; and
after sending the request, receive from the network device a message comprising an identifier identifying a second communication device that provides a semantic representation that satisfies the criteria.

11. The first communication device of claim 10, wherein the network device is any one of:
a network node being accessible to a directory comprising information about said one or more communication devices and their respective semantic representations, or
one of said one or more communication devices.

12. The first communication device of claim 10, wherein the target semantic representation is related to any one out of:
the first communication device, and
a specified ideal communication device.

13. The first communication device of claim 10, wherein the first communication device is further adapted to configure the identified second communication device to perform according to the request a task using the semantic representation that satisfies the criteria.

14. The first communication device of claim 10, wherein the received message identifying the second communication device comprises an address of the second communication device.

15. A network device, the network device comprising a processor and a memory containing instructions executable by the processor whereby the network device is configured to:
receive from a first communication device a request for information identifying one or more communication devices that provide a semantic representation that satisfies a criteria, wherein the criteria is satisfied if a semantic distance between the provided semantic representation and a target semantic representation is below a decided threshold, wherein the decided threshold relates to a tolerated semantic distance between a semantic representation and the target semantic representation, and further wherein the target semantic representation is decided by the first communication device;
after receiving the request, identify a second communication device that provides a semantic representation that satisfies the criteria; and
send to the first communication device a message comprising an identifier identifying the identified second communication device.

16. The network device of claim 15, wherein the network device is represented by a network node being accessible to a directory comprising information about said one or more communication devices and their respective semantic representations.

17. The network device of claim 15, wherein the network device is represented by one of said one or more communication devices and wherein the request is received from the first communication device in a broadcast or a multicast.

18. The network device of claim 15, wherein the network device is further adapted to register in a network node a semantic representation provided for at least one of said one or more communication devices.

19. The network device of claim 15, wherein the target semantic representation is related to any one out of:
the first communication device, and
a specified ideal communication device.

* * * * *